United States Patent
Oi et al.

(10) Patent No.: US 6,626,204 B2
(45) Date of Patent: Sep. 30, 2003

(54) CYLINDER VALVE ASSEMBLY WITH CHECK VALVE

(75) Inventors: Akira Oi, Amagasaki (JP); Mari Shiotsuki, Amagasaki (JP); Mitsumasa Kagomoto, Amagasaki (JP)

(73) Assignee: Kabushiki Kaisha Neriki, Hyogo (JP)

( * ) Notice: Subject to any disclaimer, the term of this patent is extended or adjusted under 35 U.S.C. 154(b) by 139 days.

(21) Appl. No.: 09/987,292

(22) Filed: Nov. 14, 2001

(65) Prior Publication Data

US 2002/0056476 A1 May 16, 2002

(30) Foreign Application Priority Data

Nov. 14, 2000 (JP) .......................... 2000-346411

(51) Int. Cl.⁷ .............................................. F16K 35/06
(52) U.S. Cl. ...................... 137/383; 137/522; 137/523; 137/614.19; 137/614.2; 251/65; 251/89; 251/297
(58) Field of Search .................. 137/614.19, 614.2, 137/383, 522, 523; 251/65, 89.5, 90, 89, 297

(56) References Cited

U.S. PATENT DOCUMENTS

| 3,104,088 | A | * | 9/1963 | Cator | |
|---|---|---|---|---|---|
| 3,981,328 | A | * | 9/1976 | Yonezawa | ................. 137/614.2 |
| 4,210,168 | A | | 7/1980 | Yonezawa | ................. 251/149.4 |
| 4,210,174 | A | * | 7/1980 | Eross | ........................... 137/528 |
| 4,341,245 | A | | 7/1982 | Daicho et al. | ................. 141/18 |
| 4,574,833 | A | * | 3/1986 | Custer | ......................... 137/498 |
| 5,048,565 | A | | 9/1991 | Oi | ........................... 137/614.19 |
| 5,063,976 | A | | 11/1991 | Oi et al. | ........................ 141/18 |
| 5,309,945 | A | | 5/1994 | Sakai et al. | .................. 137/861 |
| 5,738,145 | A | | 4/1998 | Daicho et al. | .............. 137/878 |
| 6,047,727 | A | | 4/2000 | Hatori et al. | ........... 137/505.28 |

FOREIGN PATENT DOCUMENTS

JP          3-20199          1/1991

* cited by examiner

*Primary Examiner*—A. Michael Chambers
(74) *Attorney, Agent, or Firm*—Bacon & Thomas, PLLC (57) ABSTRACT

An accommodation portion (53) is formed at a position where it faces a check valve member (42) through a chamber inlet (41a) of a check valve chamber (41). An opening means (51) is attached in the accommodation portion (53). This opening means (51) switches over between a valve opening position (Y) and a valve-opening cancellation position (X). A lock means (55) is attached between a peripheral wall of the accommodation portion (53) and the opening means (51). The lock means (55) changes over between a lock position (L) where it limits an advancement of the opening means (51) from the valve-opening cancellation position (X) and a lock cancellation position (M) where it allows the advancement. A valve-opening actuation means (60) is provided with a lock cancellation means (61). A magnetic force is made to occur between the lock cancellation means (61) and the lock means (55). The magnetic force changes over the lock means (55) to the lock cancellation position (M).

6 Claims, 4 Drawing Sheets

CYLINDER VALVE ASSEMBLY WITH CHECK VALVE

BACKGROUND OF THE INVENTION

1. Field of the Invention

The present invention relates to a cylinder valve assembly which is attached to a cylinder storing compressed gas, liquefied gas and the like, and more particularly to a cylinder valve assembly with a check valve, which internally houses the check valve so as to prevent reversely flowing gas, gas of a different kind, gas containing impurities and the like from flowing into a cylinder and besides to inhibit air, rain drops or the like foreign matters from entering the cylinder with the result of decreasing the purity of the stored gas.

2. Explanation of Related Art

The cylinder valve assembly with the check valve of this type comprises a housing within which an inlet bore communicates with an outlet bore through an inlet passage, a stop valve chamber, a check valve seat and a check valve chamber in the mentioned order. A check valve member is inserted into the check valve chamber and is resiliently pushed by a check spring for closing with respect to the check valve seat.

When the cylinder has an inner pressure not less than a set one, a stop valve within the stop valve chamber is opened, thereby enabling gas pressure acting on a valve face of the check valve member to open the check valve member against a valve closing force of the check spring. This results in taking gas out of the cylinder. On the other hand, when the cylinder has a residual pressure lowered to the set one, the valve closing force of the check spring overcomes the gas pressure acting on the valve face to close the check valve member. This maintains a predetermined residual pressure within the cylinder and therefore prevents invasion of foreign matters and the like from an exterior area. In the event that there comes from the outlet bore, reversely flowing gas which contains impurities residual in various instruments, is of a different kind or the like, the reversely flowing gas has a pressure cooperating with the check spring to close the check valve member.

Meanwhile, the cylinder valve assembly internally houses the foregoing check valve. Therefore, when recharging gas from the outlet bore into the cylinder, it is required to forcedly open the check valve member so as not to close the check valve member with a charging pressure. In this case, if the check valve member can be readily opened at a place other than the place where a predetermined charging system is installed, there is a likelihood that the gas which contains impurities or is of a different kind is readily charged to contaminate an interior area of the cylinder. Thus the above-mentioned check valve member is desirably constructed so that it can be opened by using a special system or a jig.

Japanese Patent Public Disclosure No. 3-20199 proposed earlier by the present Assignee recites a conventional example of the cylinder valve assembly with the check valve which can be forcedly opened when charging gas.

The conventional example forms a valve-opening means accommodation portion at a position where a check valve member faces the accommodation portion through an inlet of a check valve chamber. Attached in the valve-opening means accommodation portion is a check valve member opening means. The opening means switches over from a valve opening position where it advances to the check valve chamber and pushes the check valve member for opening it, and a valve-opening cancellation position where it retreats from the check valve chamber and separates from the check valve member. The check valve member has an input portion formed from a piston of fluid-pressure actuation type. A valve-opening actuation chamber is formed between the piston-type input portion and a rear end wall of the valve-opening means accommodation portion. The rear end wall is formed with an input hole which comprises a flow passage of pressurized fluid. The valve-opening actuation chamber communicates with an external portion of the valve-opening means accommodation portion through the input hole. The check valve member opening means is retained at the valve-opening cancellation position by a valve-opening cancellation spring so as not to open the check valve member by mistake at the time other than the time of charging. Further, the input hole composed of the flow passage is inclined with respect to an axis of the input portion of the check valve member opening means in order that such opening means might not be pushed by some other thing.

When charging gas into the cylinder, a charging means is connected to the outlet bore of the cylinder valve assembly and a source of pressurized fluid such as compressed air is connected to the input hole provided in the rear wall of the valve-opening means accommodation portion. Then the pressurized fluid is introduced into the valve-opening actuation chamber to move the check valve member opening means to a valve opening position. After having opened the check valve member, the stop valve is opened to charge gas from the outlet bore into the cylinder.

The conventional cylinder valve assembly with the check valve is excellent in that it can be easily opened by using a special system and a jig and besides the check valve member cannot be opened at a place other than the place where these predetermined charging systems are installed and that it can prevent the interior area of the cylinder from being contaminated by charging the gas which contains impurities, is of a different kind and the like. However, the conventional technique has to be still improved on the following points:

(1) It moves the check valve member opening means with the pressurized fluid and therefore requires to provide in the charging device a source of pressurized fluid such as compressed air. In addition, for example, a flow passage must be formed so as to connect the source of pressurized fluid to the input hole in communication therewith. This increases the number of parts to result in inviting a problem that it cannot be put into practice inexpensively;

(2) Instead of the foregoing construction that the check valve member opening means is moved with the pressurized fluid, it can be considered to mechanically move the check valve member opening means. However, a protecting means must be provided in order that the check valve member opening means might not be pushed by some other thing by mistake at the time other than the time of charging. Besides, the valve-opening actuation means has to adopt such a complicated structure as a cam mechanism in order to be able to move the check valve member opening means while cancelling the protecting means. This increases the number of parts to be needed with the result of entailing the problem that the conventional technique cannot be put into practice inexpensively.

SUMMARY OF THE INVENTION

The present invention has an object to provide a cylinder valve assembly with a check valve which can prevent gas from being charged at a place other than the place where a predetermined charging system is installed but can charge gas by using an existing charging device as it is at the place where the predetermined charging system is installed and besides can be put into practice with a simple structure inexpensively.

In order to accomplish the above object, the present invention has constructed a cylinder valve assembly with a check valve in the following manner, for example, as shown in FIGS. 1 to 5.

A housing 4 is formed with an inlet bore 7, a stop valve chamber 9, a check valve chamber 41 and a valve-opening means accommodation portion 53. The check valve chamber 41 is provided with a check spring 43 and a chamber inlet 41a which communicates with the inlet bore 7 through the stop valve chamber 9. A check valve seat 44 is formed around the chamber inlet 41a. A check valve member 42 is inserted into the check valve chamber 41 and is resiliently pushed by the check spring 43 to the check valve seat 44. The valve-opening means accommodation portion 53 has a peripheral wall and is formed at a position where it faces the check valve member 42 through the chamber inlet 41a. A check valve member opening means 51 is attached in the valve-opening means accommodation portion 53. The opening means 51 is pushed by a valve-opening actuation member 60 to switch over to a valve opening position (Y) where the opening means 51 advances toward the check valve chamber 41 and pushes the check valve member 42 for opening. It is released from a pushing force of the valve-opening actuation member 60 to switch over to a valve-opening cancellation position (X) where it retreats from the check valve chamber 41 and separates from the check valve member 42. A lock means 55 made of a magnetic body is attached between the peripheral wall of the valve-opening means accommodation portion 53 and the check valve member opening means 51. This lock means 55 changes over between a lock position (L) where it limits an advancement of the check valve member opening means 51 from the valve-opening cancellation position (X) and a lock cancellation position (M) where it allows this advancement. The valve-opening actuation means 60 is provided with a lock cancellation means 61 made of a magnetic body. At least one of the lock means 55 and the lock cancellation means 61 is formed from a magnet. There occurs between the lock means 55 and the lock cancellation means 60 a magnetic force, which changes over the lock means 55 from the lock position (L) to the lock cancellation position (M).

The present invention functions as follows.

When taking out gas or storing it, the check valve member opening means is arranged at the valve-opening cancellation position and the lock means exists at the lock position. This prevents the check valve member opening means from moving to the valve opening position even if some other thing collides with the check valve member opening means and pushes it erroneously. Accordingly, there is no likelihood that the check valve member inadvertently opens.

When charging gas, if the valve-opening actuation means with the lock cancellation means is attached to a predetermined position, the lock means changes over to the lock cancellation position by the magnetic force occurring between the lock cancellation means and the lock means. Subsequently, when the valve-opening actuation means pushes the lock means as it remains at the lock cancellation position, the check valve member opening means moves to the valve opening position to push the check valve member for forced opening. This charges the gas from the charging device into the cylinder through the outlet bore, the check valve chamber, the stop valve chamber and the inlet bore in the mentioned order.

It is possible to form either of the lock means and the lock cancellation means from a magnet. However, in general, since the housing and the like is formed from a magnetic body, preferably, the lock means is not formed from a magnet but the lock cancellation means is made of a magnet. The lock cancellation means is not necessarily formed integral with the valve-opening actuation means. However, in the case where both are formed integral with each other, a sequential operation can perform the switch-over of the lock means to the lock cancellation position by the lock cancellation means as well as the movement of the check valve member opening means to the valve opening position by the valve-opening actuation means. Therefore, this case is more preferable.

The present invention is constructed and functions as mentioned above, and therefore offers the following advantages.

The lock means changes over to the lock cancellation position only by attaching the valve-opening actuation means to the predetermined position. If the valve-opening actuation means pushes the check valve member opening means with the lock means remaining at the lock cancellation position, the check valve member can be opened. Therefore, the valve-opening actuation can be performed with a simple construction. Additionally, it suffices if the lock means is made of a magnetic body and the valve-opening actuation means is provided with a lock cancellation means formed from a magnetic body. This reduces the number of parts, simplifies the structure and besides gets rid of the necessity to provide any additional system in the charging device with the result of being able to put the present invention into practice inexpensively.

The present invention includes the following cylinder valve assembly with a check valve.

The lock cancellation means 61 is made of a magnet and is disposed on a leading end portion of the valve-opening actuation means 60, which end portion faces the check valve member opening means 51. In this case, the present invention is applicable to a common cylinder valve assembly having a housing 4 formed from a cast iron or the like magnetic body. Besides, when the valve-opening actuation means 60 has its leading end brought into contact with a rear end portion of the check valve member opening means 51 to change over the lock means 55 to the lock cancellation position (M) and push it as it is, the check valve member opening means 51 can be moved to the valve opening position (Y). Thus only an extremely simple operation is sufficient.

The check valve member opening means 51 has an outer peripheral surface formed with an annular lock means accommodation groove 54. On the other hand, the valve-opening means accommodation portion 53 has a peripheral wall formed with an engaging groove 59 at a position where the lock means accommodation groove 54 opposes to the engaging groove 59 when the check valve member opening means 51 comes to the valve-opening cancellation position (X). And the lock means 55 is made spherical and accommodated in the accommodation groove 54. The lock means 55 partly invades the engaging groove 59 and comes to the lock position (L). In this case, the lock means 55 comprises at least one steel ball or the like and besides changes over to the lock position (L) owing to the action of gravity. This reduces the number of parts with the result of being able to put the present invention into practice inexpensively with a simple construction.

Preferably, the lock means accommodation groove 54 is formed wider as it opens more outwardly and has its side walls inclined. This makes it possible to change over the lock means 55 to the lock position (L) through the action of gravity even if the check valve member 42 or the check valve member opening means 51 is arranged in any direction.

More preferably, the check valve member opening means 51 has its rear end concaved to provide an attaching recess 51a, to which the valve-opening actuation means 60 has its leading end attached. This enables the magnetic force of the lock cancellation means 61 disposed on the leading end portion of the valve-opening actuation means 60 to readily act on the lock means 55.

Still more preferably, the valve-opening means accommodation portion 53 is provided with a valve-opening cancellation spring 56. The spring 56 resiliently pushes the check valve member opening means 51 from the valve opening position (Y) to the valve-opening cancellation position (X). Thus the check valve member opening means 51 moves from the valve opening position (Y) to the valve-opening cancellation position (X) by an urging force of the spring 56, upon removal of the pushing force of the valve-opening actuation means 60, which results in releasing the check valve member 42 from the forced opening condition.

BRIEF DESCRIPTION OF THE DRAWINGS

FIG. 3(a) is a sectional view of a check valve with a valve-opening actuation means attached thereto. FIG. 3(b) is a sectional view of the check valve with a check valve member opening means moved to a valve opening position;

DESCRIPTION OF THE PREFERRED EMBODIMENTS

Hereafter, embodiments of the present invention are explained based on the drawings.

First Embodiment

Figure 1:
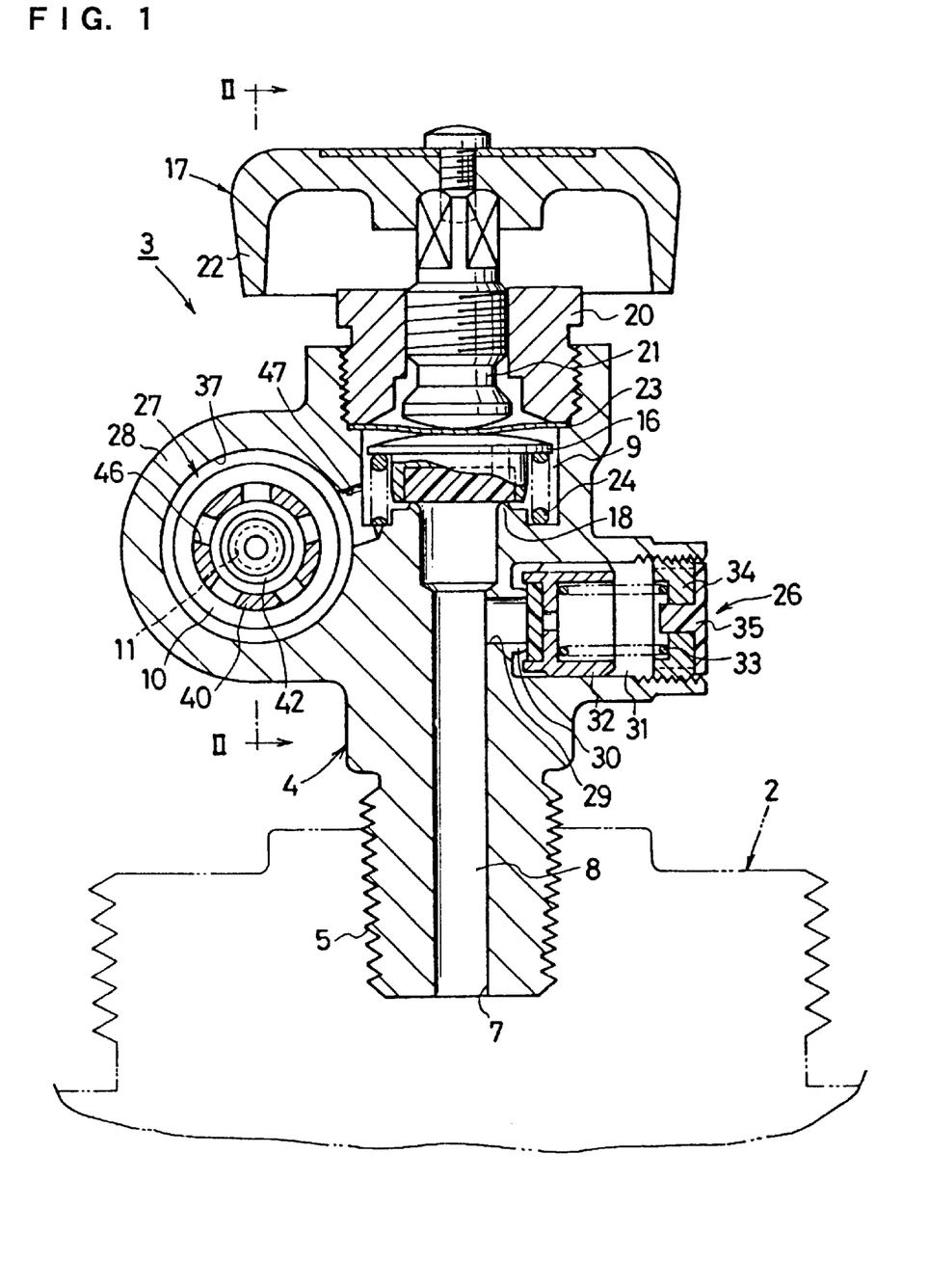
FIG. 1 shows a first embodiment of the present invention and is a vertical sectional view of a cylinder valve assembly.
Figure 2:
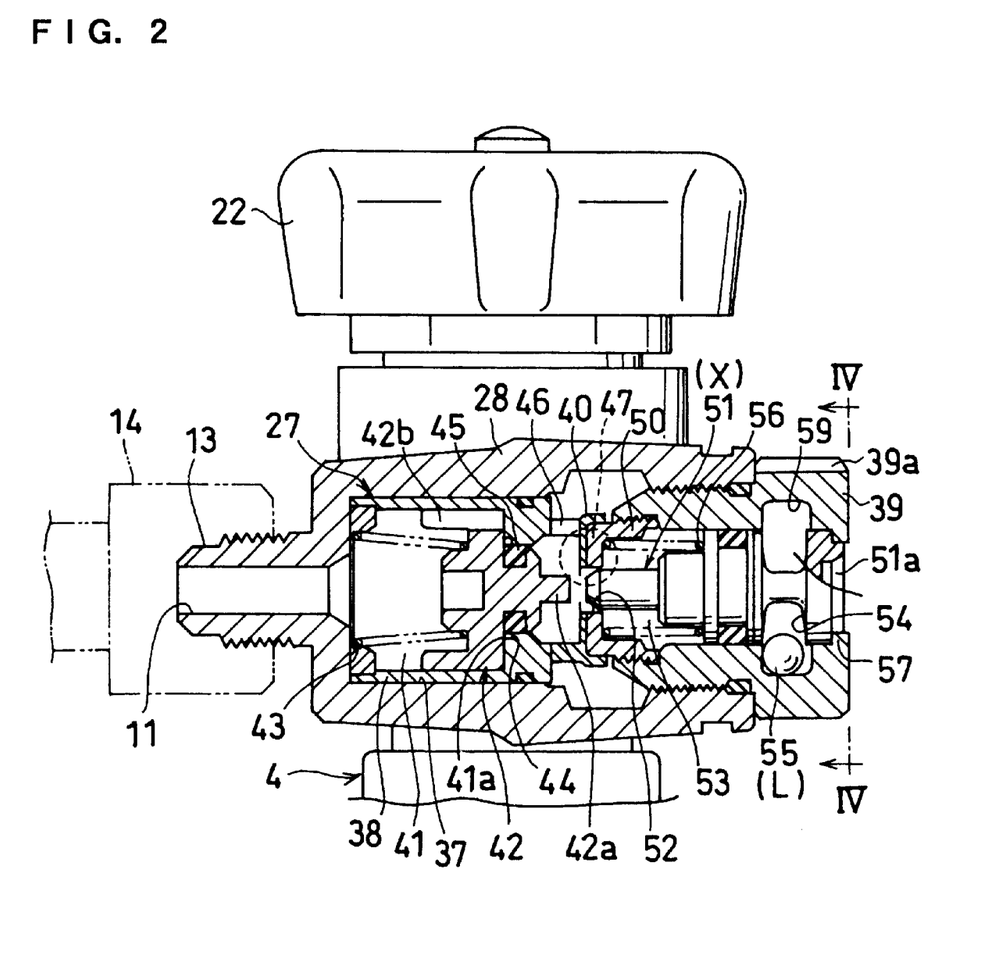
FIG. 2 is a sectional view when seen along a line II—II in a direction indicated by arrows in FIG. 1.
Figure 3:
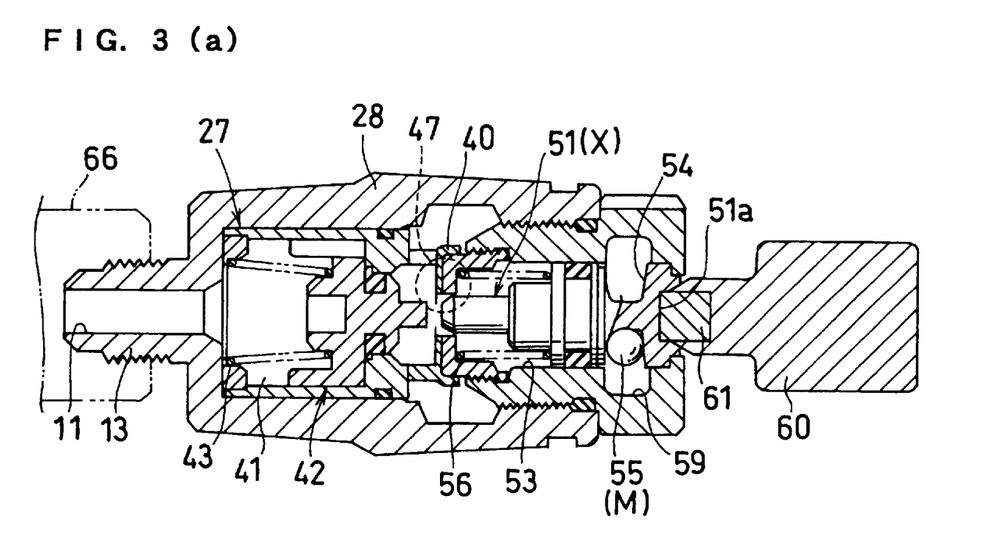
FIG. 3 is a view explaining procedures for opening a check valve member.

As shown in FIGS. 1 and 2, a gas cylinder 1 has a neck portion 2 to which a housing 4 of a cylinder valve assembly 3 is fixed in screw-thread engagement. The housing 4 is made vertically long and has a threaded leg portion 5 formed at its lower surface with an inlet bore 7. This inlet bore 7 communicates with an outlet bore 11 through a vertically oriented inlet passage 8, a stop valve chamber 9 and an outlet passage 10 in the mentioned order. The inlet passage 8 is formed coaxially with the stop valve chamber 9. The housing 4 has a mid height portion opened forwardly (in a leftward direction in FIG. 2) to provide the outlet bore 11. The outlet bore 11 has its peripheral wall provided with an outlet nozzle 13, to which a gas takeout mouthpiece 14 is connectable.

The above-mentioned stop valve chamber 9 is formed at an upper side portion within the housing 4 so as to open upwardly. A stop valve member 16 is inserted into the stop valve chamber 9 from above. The stop valve member 16 is actuated for opening and closing with respect to a stop valve seat 18 by a manual stop valve opening and closing device 17. More specifically, a valve rod 21 engages with a valve closure 20 in screw-thread fitting relationship so as to be able to vertically advance and retreat. If a handle wheel 22 downwardly advances the valve rod 21, the stop valve member 16 is brought into sealing contact with the stop valve seat 18 through a metal diaphragm 23. Conversely, when the handle wheel 22 upwardly retracts the valve rod 21, the stop valve member 16 separates from the stop valve seat 18 with a resilient force of a valve opening spring 24.

A safety valve 26 is provided at a lower side portion of the housing 4 and a check valve 27 is internally attached at a horizontally projecting portion 28 of the upper side portion of the housing 4. By selecting where to attach the check valve 27 as such, the cylinder valve assembly 3 can be made compact as a whole. Therefore, it is readily accommodated within a protector cap (not shown) which is fixed to the neck portion 2 of the gas cylinder 1 in screw-thread engagement. This makes it possible to employ the existing gas cylinder and protector cap as they are.

The safety valve 26 is constructed as follows.

A gas lead-out passage 29, a safety valve seat 30, a safety valve chamber 31 are formed in the mentioned order from a mid height portion of the inlet passage 8. A safety valve member 32 is inserted into the safety valve chamber 31. The safety valve member 32 is brought into sealing contact with the safety valve seat 30 by a spring 33 which sets a pressure for safety operation. A screw 34 adjusts a resilient force of the spring 33. The screw 34 is formed with a gas blow-out hole (not shown). Numeral 35 designates a dust-proof cap. This safety valve 26 may be of rupture-disk type or the like instead of being of spring-type.

The check valve 27 is constructed as follows.

A check valve attaching hole which extends in a front and rear direction (left and right direction in FIG. 2) is formed within the horizontally projecting portion 28 and at a lateral and external side portion of the stop valve chamber 9 so as to open rearwardly (rightwardly on the drawing). A cylindrical cassette 38 is detachably and hermetically inserted into the check valve attaching hole 37. The cylindrical cassette 38 is pushed and fixed by a cylinder presser 39 through a push ring 40 and a presser closure 50. The cylinder presser 39 is able to advance and retreat with respect to the horizontally projecting portion 28 owing to a screwing cutter groove 39a formed in a peripheral wall thereof.

A check valve member 42 is inserted into a check valve chamber 41 formed within the cylindrical cassette 38. A check valve seat 44 is formed on a side of an inlet 41a of the check valve chamber 41. The check valve member 42 is resiliently pushed toward the check valve seat 44 by a check spring 43 within the check valve chamber 41. The check valve member 42 has a peripheral wall formed with at least one flow passage groove 42b in the front and rear direction and has a rear portion to which a valve face packing 45 is attached in fitting relationship. The stop valve chamber 9 communicates with the check valve chamber 41 through an intermediate communication hole 47, a space on an outer peripheral side of the push ring 40, a plurality of cutout grooves 46 formed in a peripheral wall of the push ring 40, and an inner space of the push ring 40 in the mentioned order. If the check valve 27 is formed into a cassette structure, it can be put and removed merely through attaching the cylindrical cassette 38 to the horizontally projecting portion 28 and detaching it therefrom. This facilitates the maintenance.

Disposed in the horizontally projecting portion 28 is a check valve member opening means 51, which forcedly separates the check valve member 42 from the check valve seat 44.

Within the cylinder presser 39, a valve-opening means accommodation portion 53 is provided at a position where it faces the check valve member 42 through the inlet 41a of the check valve chamber 41. A check valve member opening means 51 is accommodated within the valve-opening means accommodation portion 53 hermetically so as to be able to advance and retreat. The presser closure 50 closes a front side of the valve-opening means accommodation portion 53 and is formed with a valve-opening means insertion hole 52 substantially coaxially with the check valve member 42 so that the hole 52 faces a portion 42a to be actuated for valve opening and extends through the presser closure 50. The check valve member opening means 51 is inserted into the valve-opening means insertion hole 52 so as to be able to advance and retreat in the front and rear direction.

The check valve member opening means 51 has a rear end (right end portion in FIG. 2) concaved to provide an attaching recess 51a and is pushed forward against a resilient force of a valve-opening cancellation spring 56 by attaching to the recess 51a a leading end portion of a valve-opening actuation means to be mentioned later. The check valve member opening means 51 is received by an annular engaging portion 57 formed at a rear end of the valve-opening means accommodation portion 53 so that the opening means 51 might not retreat more than a predetermined distance by the resilient force of the valve-opening cancellation spring 56.

The check valve member opening means 51 has an outer peripheral surface formed with an annular lock means accommodation groove 54, which accommodates a lock means 55 formed from a steel ball. On the other hand, the valve-opening means accommodation portion 53 is provided with an engaging groove 59 at a position where the engaging groove 59 opposes to the lock means accommodation groove 54 when the opening means 51 comes to a valve-opening cancellation position (X). Consequently, in the event that the check valve member opening means 51 comes to the valve-opening cancellation position (X), the lock means 55 partly invades the engaging groove 59 owing to the action of gravity and comes to a lock position (L) where it limits the advancing and retreating movement of the check valve member opening means 51. Thus even if the check valve member opening means 51 is pushed forward due to a collision of some other thing with its rear end side or through a push rod by any mistake, it is possible to prevent the opening means 51 from moving forward with the result of inhibiting the check valve member 42 from opening erroneously.

The cylinder valve assembly 3 with the check valve operates as follows.

When taking out gas, the stop valve opening and closing device 17 opens the stop valve member 16. With the stop valve member 16 opened, if the gas cylinder 1 has a residual pressure exceeding a set one, gas flows from the intermediate communication hole 47 into the push ring 40 and its pressure separates the check valve member 42 from the check valve seat 44 against a valve closing force of the check spring 43. This enables the gas within the gas cylinder 1 to flow from the check valve chamber inlet 41a to the outlet bore 11 through the flow passage groove 42b of the check valve member 42. On the other hand, if the gas cylinder 1 has its residual pressure lowered to the set one as the gas is continuously taken out, the check valve member 42 is brought into sealing contact with the check valve seat 44 with the valve closing force of the check spring 43. This retains the residual pressure of the gas cylinder 1 at the set one.

In the case where reversely flowing gas enters from the outlet bore 11 into the check valve chamber 41, the pressure of the reversely flowing gas acts on the check valve member 42 as a valve closing force in addition to the valve closing force of the check spring 43 and brings the check valve member 42 into sealing contact with the check valve seat 44. This inhibits the entrance of the reversely flowing gas from the check valve seat 44 to the inlet bore 7 via the stop valve chamber 9.

When charging gas into an evacuated gas cylinder 1, it is operated by the following procedures. The operation procedures are the same as those in the case of vacuuming.

As shown in FIG. 3(a), a gas charging means 66 has its mouthpiece externally fitted onto the outlet nozzle 13 of the cylinder valve assembly 3 hermetically. Next, the leading end portion of the valve-opening actuation means 60 is attached to the attaching recess 51a provided by concaving the rear end of the check valve member opening means 51. A lock cancellation means 61 made of a magnet is disposed on the leading end of the valve-opening actuation means 60. The lock means 55 formed from the steel ball is attracted against the action of gravity by a magnetic force which acts between itself and the lock cancellation means 61 and is disengaged from the engaging groove 59 to change over to a lock cancellation position (M) where the lock means 55 is accommodated within the lock means accommodation groove 54 in its entirety. With the lock means 55 remaining at this lock cancellation position (M), if the valve opening actuation means 60 is pushed, as shown in FIG. 3(b), the check valve member opening means 51 advances to switch over to a valve opening position (Y) where it pushes and opens the check valve member 42.

Figure 4:
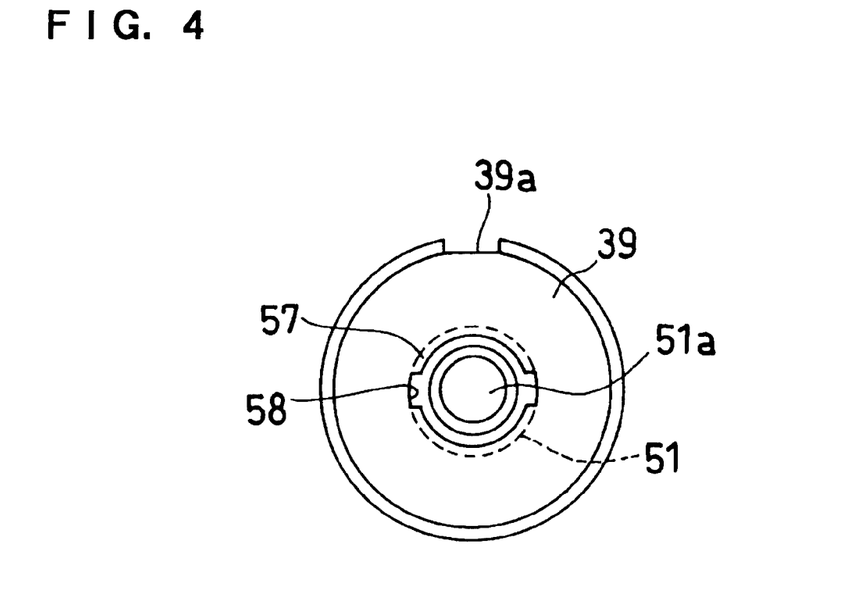
FIG. 4 is an end view when seen along a line IV—IV in a direction indicated by arrows in FIG. 2.

The valve-opening actuation means 60 is provided on an outer surface of its leading end side with a convex portion 62, while the valve opening means accommodation portion 53 has a rear end formed with the annular engaging portion 57, which is provided with a notch 58 as shown in FIG. 4. When pushing in the valve-opening actuation means 60, the convex portion 62 is inserted through the notch 58 and then the valve-opening actuation means 60 is rotated by 90 degrees, thereby enabling the convex portion 62 to engage with the annular engaging portion 57. This maintains the check valve member opening means 51 at the valve opening position (Y).

After the check valve member 42 has been forcedly opened in the foregoing manner, the stop valve opening and closing device 17 opens the stop valve member 16 as mentioned above. Thus the gas charged from the gas charging means 66 flows from the gas outlet bore 11 into the intermediate communication hole 47 through the check valve chamber 41, its inlet 41a and the push ring 40. It is further charged from the intermediate communication hole 47 into the gas cylinder 1 through the stop valve chamber 9, the inlet passage 8 and the inlet bore 7.

After the gas has been charged, the stop valve member 16 closes and the gas charging means 66 is removed from the outlet nozzle 13. At the same time, the valve-opening actuation means 60 is pulled back. This switches over the check valve member opening means 51 to the valve-opening cancellation position (Y) where it is pushed rightwards by the valve-opening cancellation spring 56 and separates from the check valve member 42, thereby allowing the check valve member 42 to effect the checking action.

When the valve-opening actuation means 60 is detached from the attaching recess 51a at the rear end of the check valve member opening means 51, the lock means 55 falls by the action of gravity and partly invades the engaging groove 59 to change over to the lock position (L) (see FIG. 2).

The position and the direction where the check valve chamber 41 is arranged are not limited to those mentioned in the foregoing embodiment. For example, in the case where the check valve member is arranged so that it moves in a vertical direction, the check valve member opening means is disposed in the same direction and the lock means accommodation groove is formed in a horizontal plane. Therefore, the lock means accommodation groove is formed wider as it opens more outwardly and has its side walls inclined. As a result, even if the check valve member or the check valve member opening means is arranged in any direction, the lock means is adapted so that it can change over to the lock position by the action of gravity.

Second Embodiment

Figure 5:
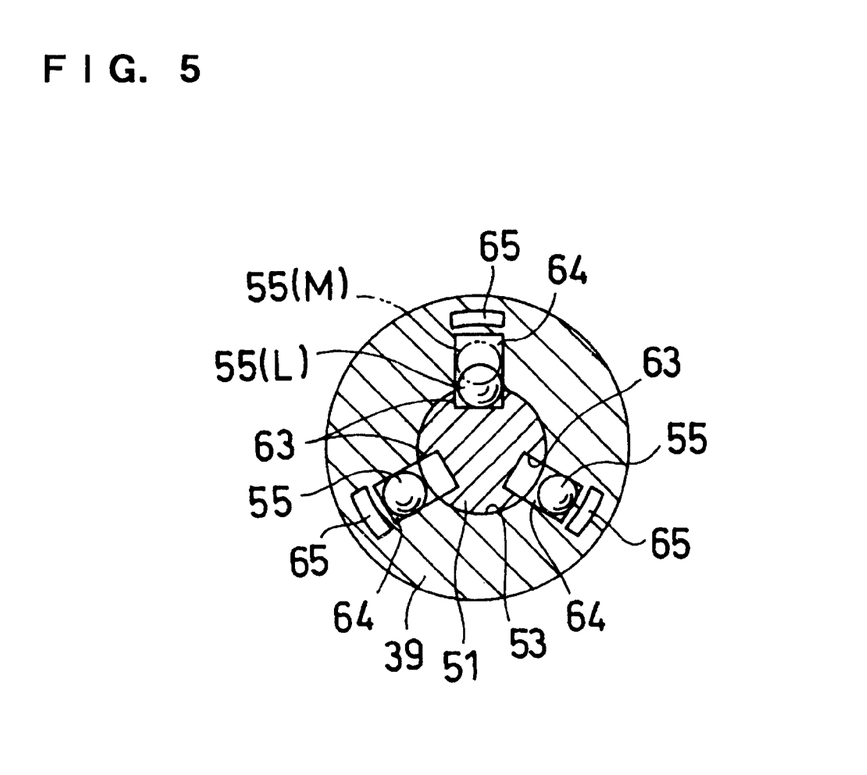
FIG. 5 shows a second embodiment of the present invention and is a sectional view of the valve-opening actuation means in the vicinity of a lock means.

FIG. 5 shows a second embodiment and is a sectional view of the valve-opening actuation means in the vicinity of the lock means.

In this second embodiment, the check valve member opening means 51 has its outer peripheral surface concaved at three portions to provide lock means engaging holes 63. The valve-opening means accommodation portion 53 has its inner surface formed with lock means accommodation holes 64 at positions where the accommodation holes 64 oppose to the engaging holes 63. Every lock means accommodation hole 64 accommodates a lock means 55 formed from a steel ball. The lock means 55 comes to the lock position (L) where it partly invades the lock means engaging hole 63.

The valve-opening means accommodation portion 53 is formed with a lock cancellation means attaching portion 65 outside each of the lock means accommodation holes 64. When a lock cancellation means made of a magnet is attached to this attaching portion 65, each of the lock means 55 is attracted and comes to the lock cancellation position (M) where the lock means 55 is accommodated within the lock means accommodation hole 64 in its entirety. Consequently, in this state, if the valve-opening actuation means 60 pushes in the check valve member opening means 51, it is possible to change over the opening means 51 to the valve opening position.

The respective embodiments employ a spherical lock means. However, the lock means of the present invention may be cylindrical or take the other shapes. Further, in the foregoing embodiments, the lock means changes over to the lock position by the action of gravity. However, it may change over to the lock position by using other biasing means such as a spring.

What is claimed is:

1. A cylinder valve assembly with a check valve comprising:

a housing (4) which has an inlet bore (7), a stop valve chamber (9), a check valve chamber (41) and a valve-opening means accommodation portion (53);

the check valve chamber (41) provided with a check spring (43) and a chamber inlet (41a) which communicates with the inlet bore (7) through the stop valve chamber (9);

a check valve seat (44) formed around the chamber inlet (41a);

a check valve member (42) inserted into the check valve chamber (41) and resiliently pushed toward the check valve seat (44) by the check spring (43);

the valve-opening means accommodation portion (53) having a peripheral wall and formed at a position where it faces the check valve member (42) through the chamber inlet (41a);

a check valve member opening means (51) attached in the valve-opening means accommodation portion (53), the opening means (51) switching over by being pushed through a valve-opening actuation means (60) to a valve opening position (Y) where it advances toward the check valve chamber (41) and pushes the check valve member (42) for opening it, and, upon removal of the pushing force of the valve-opening actuation means (60), to a valve-opening cancellation position (X) where it retreats from the check valve chamber (41) and separates from the check valve member (42);

a lock means (55) made of a magnet and attached between the peripheral wall of the valve-opening means accommodation portion (53) and the check valve member opening means (51), the lock means (55) changing over between a lock position (L) where it limits an advancement of the check valve member opening means (51) from the valve-opening cancellation position (X) and a lock cancellation position (M) where it allows the advancement;

a lock cancellation means (61) formed from a magnetic body and provided in the valve-opening actuation means (60); and at least one of the lock means (55) and the lock cancellation means (61) being made of a magnet, the lock means (55) changing over from the lock position (L) to the lock cancellation position (M) through a magnetic force produced between the lock means (55) and the lock cancellation means (61).

2. The cylinder valve assembly with the check valve as set forth in claim 1, wherein the valve-opening actuation means (60) has a leading end portion at a position where it faces the check valve member opening means (51), and the lock cancellation means (61) is formed from a magnet and disposed on the leading end portion of the valve-opening actuation means (60).

3. The cylinder valve assembly with the check valve as set forth in claim 2, wherein the check valve member opening means (51) has an outer peripheral surface, in which a lock means accommodation groove (54) is formed annularly, an engaging groove (59) being formed in the peripheral wall of the valve-opening means accommodation portion (53) at a position where it opposes to the lock means accommodation groove (54) of the check valve member opening means (51) existing at the valve-opening position (X), the lock means (55) being formed spherical and accommodated in the lock means accommodation groove (54), the lock means (59) partly invading the engaging groove (59) to come to the lock position (L).

4. The cylinder valve assembly with the check valve as set forth in claim 3, wherein the lock means accommodation groove (54) is formed wider as it opens more outwardly and has its side walls inclined.

5. The cylinder valve assembly with the check valve as set forth in claim 2, wherein the check valve member opening means (51) has a rear end on a side opposite to the check valve member (42) and an attaching recess (51a) is provided by concaving the rear end of the check valve member opening means (51), the valve-opening actuation means (60) having its leading end portion attached to the attaching recess (51a).

6. The cylinder valve assembly with the check valve as set forth in claim 1, wherein a valve-opening cancellation spring (56) is arranged in the valve-opening means accommodation portion (53) and resiliently pushes the check valve member opening means (51) from the valve opening position (Y) to the valve-opening cancellation position (X).

* * * * *